June 13, 1950        H. M. WOOD        2,511,138
ARTIFICIAL BAIT
Filed June 5, 1946
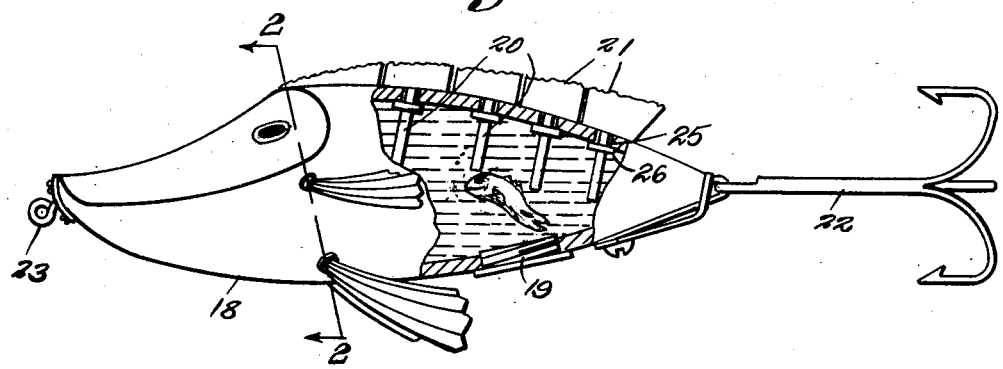
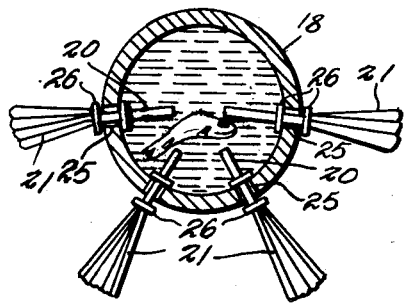
H. M. Wood
Inventor
By Knowles
Attorneys.

Patented June 13, 1950

2,511,138

UNITED STATES PATENT OFFICE 2,511,138

ARTIFICIAL BAIT

Halbert Murray Wood, Madison, Wis.

Application June 5, 1946, Serial No. 674,482

2 Claims. (Cl. 43—41)

This invention relates to artificial bait, the primary object of the invention being to provide artificial bait having means to cause the bait to simulate live bait, such as grasshoppers, flies, crawfish or the like, upon the movement of the artificial bait through the water.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing

Figure 1 is an elevational view partly in section, illustrating an artificial bait constructed in accordance with the invention.

Fig. 2 is a sectional view taken on line 2—2 of Fig. 1.

Referring to the drawing in detail, the artificial bait, which is constructed to simulate live bait, comprises a hollow body portion 18, the hollow body portion being formed with an opening through which water may be forced into the body portion, the opening being closed by the plug 19.

This body portion is constructed to simulate a live fish, and is formed with a plurality of openings 25 in the wall thereof, the openings 25 accommodating the shafts 20 of the blades 21. The shafts 20 are of lengths to extend appreciable distances within the body portion, and since these shafts are loosely mounted within their openings, movement of the blades 21 will be permitted, as the artificial bait is drawn through the water.

The shafts 20 are provided with flanges 26, which contact the wall of the body, preventing displacement of the shafts and blades, but allowing movement of the shafts and blades with respect to the body.

It is contemplated to place live minnows within the body portion after it has been filled with water so that the minnows swimming in the water of the bait, will cause an agitation of the water to move the shafts 20 and their blades 21 to simulate the movements of live bait, to attract fish.

In the invention hooks 22 extend from the rear end of the body portion, while at the front end thereof an eye 23 is provided, to which a fishing line may be connected.

It may be further stated that the body portion of the artificial bait is constructed of transparent material so that the live bait contained therein may be viewed through the wall of the artificial bait to attract fish.

From the foregoing it will be seen that due to the construction shown and described, I have provided an artificial bait, having mechanical means for causing the artificial bait to move in the water, simulating the actions of live bait.

Having thus described the invention, what is claimed is:

1. Artificial bait comprising a hollow body portion in which water is contained, blades having shafts, the shafts extending through the wall of the body portion and lying within the hollow body portion, flanges on the shafts holding the shafts loosely within the openings, the blades being disposed exteriorly of the body portion, and said body portion adapted to contain live fish agitating the water within the body portion as the fish swim within the body portion, whereby said shafts and blades are moved, simulating live bait.

2. Artificial bait comprising a hollow body portion in which water is contained, said body portion having openings formed in the wall thereof, shafts disposed within the openings and having blades forming a part thereof, the diameters of the shafts being less than the diameters of the openings, flanges on the shafts engaging the body portion adjacent to the openings loosely mounting the shafts within the openings, the blades being disposed exteriorly of the body portion, said body portion having an opening through which live fish are positioned in the body portion whereby the fish swimming within the water of the body portion agitate the water moving the shafts and blades, simulating live bait.

HALBERT MURRAY WOOD.

REFERENCES CITED

The following references are of record in the file of this patent:

UNITED STATES PATENTS

| Number | Name | Date |
| --- | --- | --- |
| 726,020 | Bryan | Apr. 21, 1903 |
| 1,068,908 | Lane | July 29, 1913 |
| 1,306,362 | Wall | June 10, 1919 |

FOREIGN PATENTS

| Number | Country | Date |
| --- | --- | --- |
| 760,465 | France | Dec. 14, 1933 |